Figure 1:
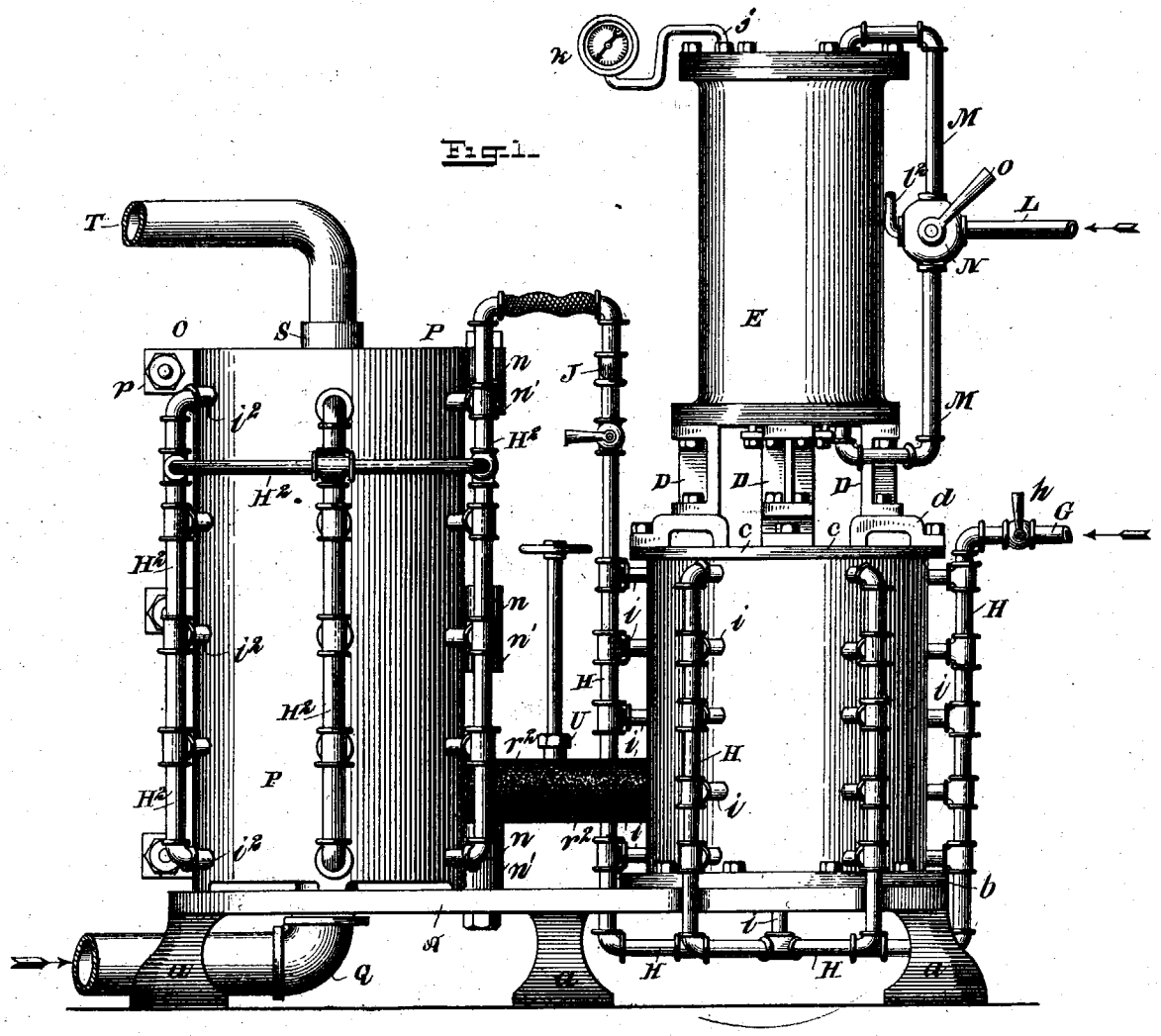

No. 11,902. Reissued Apr. 9, 1901.

E. HETT.

ART OF PRINTING.

(Application filed Mar. 5, 1901.)

5 Sheets—Sheet 1.

WITNESSES:
Sidney Mann,
John A. Clark.

INVENTOR
Edward Hett
BY
Kenyon & Kenyon
ATTORNEYS

THE NORRIS PETERS CO., WASHINGTON, D. C.

No. 11,902. Reissued Apr. 9, 1901.

E. HETT.

ART OF PRINTING.

(Application filed Mar. 5, 1901.)

5 Sheets—Sheet 2.

WITNESSES:

Sidney Mann

John A. Clark

INVENTOR

Edward Hett

BY

Kenyon & Kenyon

ATTORNEYS

THE NORRIS PETERS CO., WASHINGTON, D. C.

No. 11,902. Reissued Apr. 9, 1901.

E. HETT.

ART OF PRINTING.

(Application filed Mar. 5, 1901.)

5 Sheets—Sheet 3.

WITNESSES:

Sidney Mann

John A. Clark

INVENTOR

Edward Hett

BY

Kemon & Kemon

ATTORNEYS

THE NORRIS PETERS CO., WASHINGTON, D. C.

No. 11,902. Reissued Apr. 9, 1901.

E. HETT.

ART OF PRINTING.

(Application filed Mar. 5, 1901.)

5 Sheets—Sheet 4.

WITNESSES:

Sidney Mann

John A. Clark

INVENTOR

Edward Hett

BY

Kenyon & Kenyon

ATTORNEYS

THE NORRIS PETERS CO., WASHINGTON, D. C.

No. 11,902. Reissued Apr. 9, 1901.

E. HETT.

ART OF PRINTING.

(Application filed Mar. 5, 1901.)

5 Sheets—Sheet 5.

WITNESSES:
Sidney Mann,
John A. Clark

INVENTOR
Edward Hett
BY
Kenyon & Kenyon
ATTORNEYS

THE NORRIS PETERS CO., WASHINGTON, D. C.

UNITED STATES PATENT OFFICE.

EDWARD HETT, OF NEWDORP, NEW YORK, ASSIGNOR TO THE AMERICAN LITHOGRAPHIC COMPANY, OF NEW YORK.

ART OF PRINTING.

SPECIFICATION forming part of Reissued Letters Patent No. 11,902, dated April 9, 1901.

Original No. 662,857, dated November 27, 1900. Application for reissue filed March 5, 1901. Serial No. 49,964.

*To all whom it may concern:*

Be it known that I, EDWARD HETT, a citizen of the United States, and a resident of Newdorp, in the county of Richmond and State of New York, have invented certain new and useful Improvements in the Art of Printing, of which the following is a specification.

My present invention relates to the art of printing, as well relief-printing as planographic and intaglio printing.

It has for its objects to cheapen and improve such printing, particularly in relation to the accurate and cheap preparation of a series of printing devices or surfaces adapted for use in a given press; and it consists of the improvements in the art which will be found hereinafter fully explained, and illustrated in the drawings, forming part of this specification.

The present application is Division A of application, Serial No. 701,196, filed by me January 5, 1899.

The several novel features of the present invention will be found particularly pointed out in the claims of this specification; and to enable those skilled in the art to which my said improvements relate to practice the same, either according to what is herein shown and described or under some modifications thereof, I will now proceed to more fully describe my invention, referring by letters of reference to the accompanying drawings, which make part of this specification, and in which I have shown apparatus that I have devised suitable to carry into effect my said improvements in the art.

Figure 2:
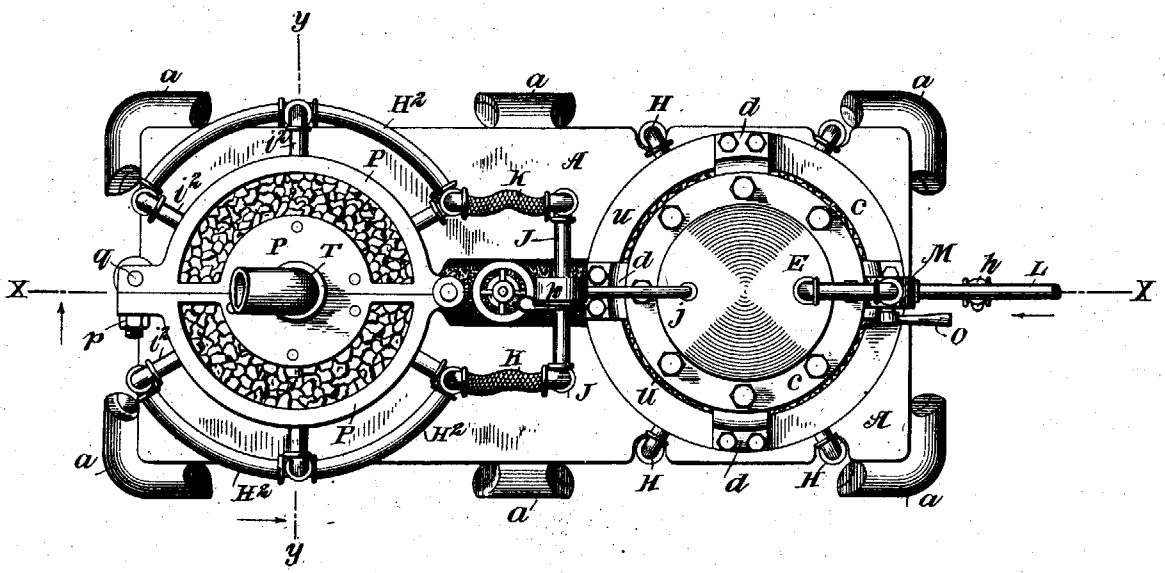
Figure 5:
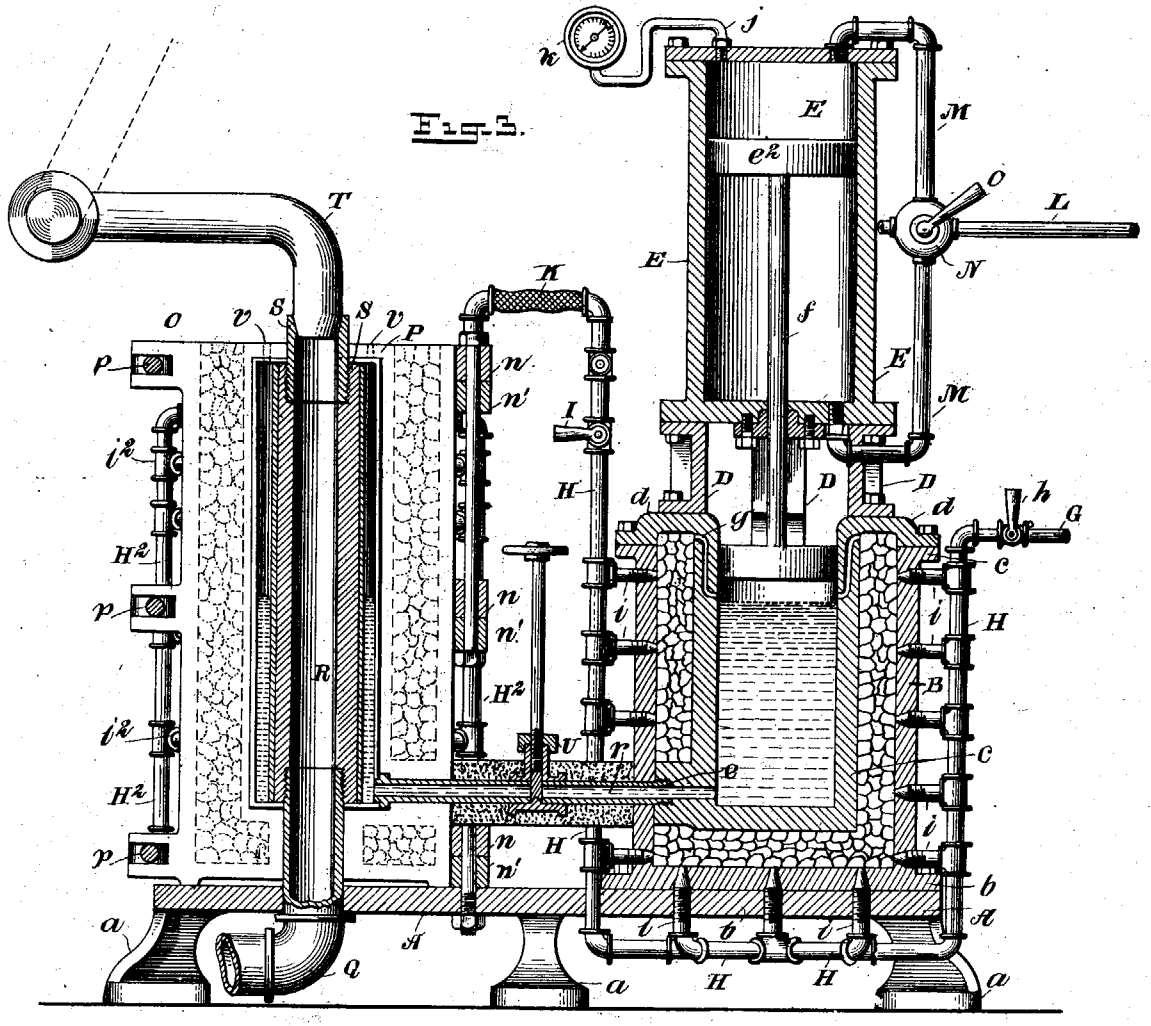
Figure 5:
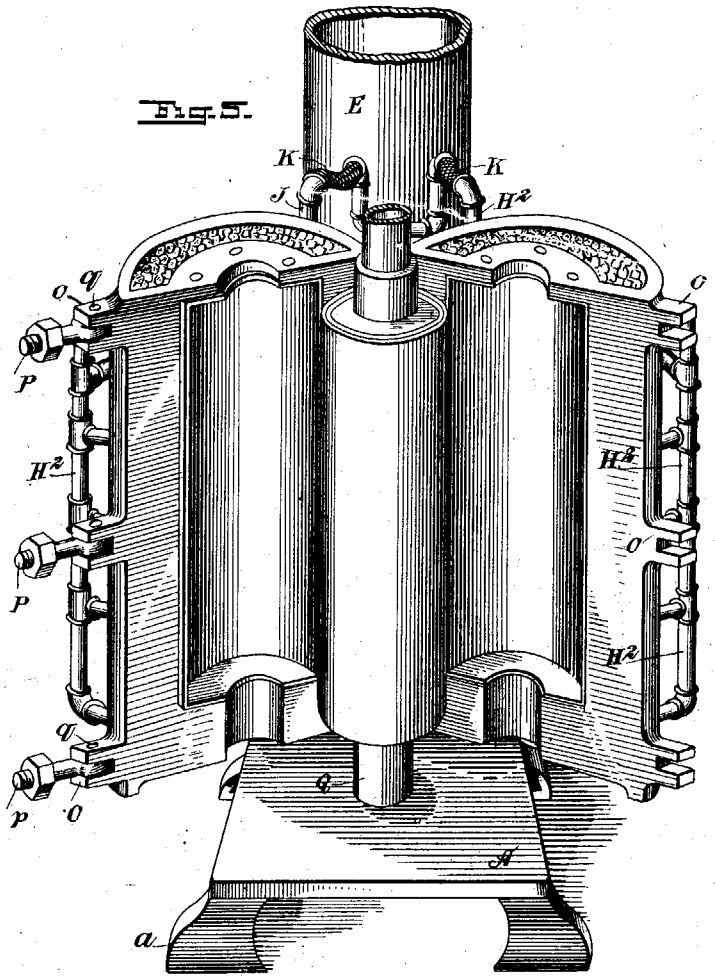
Figure 4:
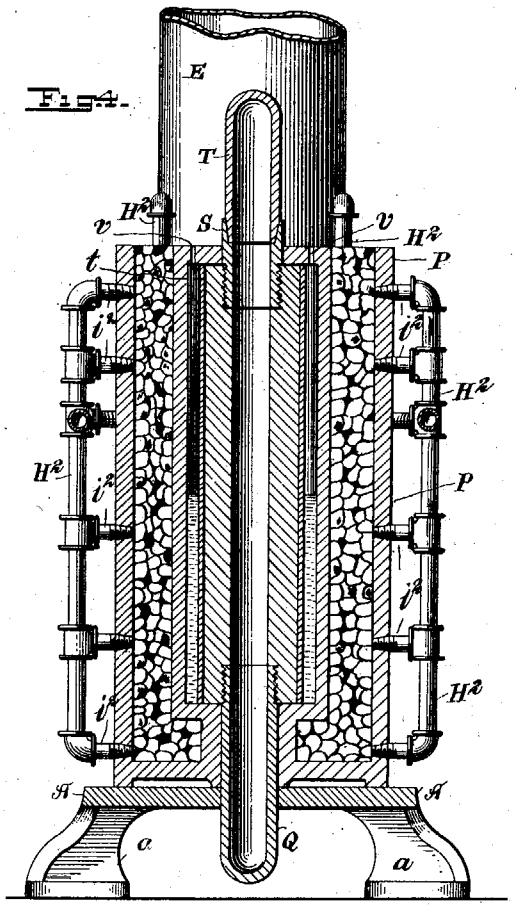
Figure 7:
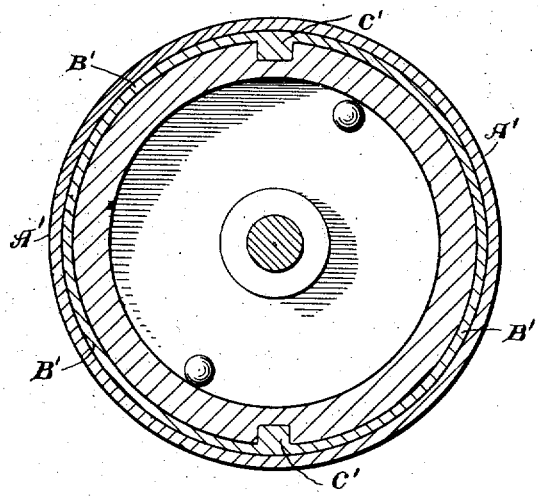
Figure 6:
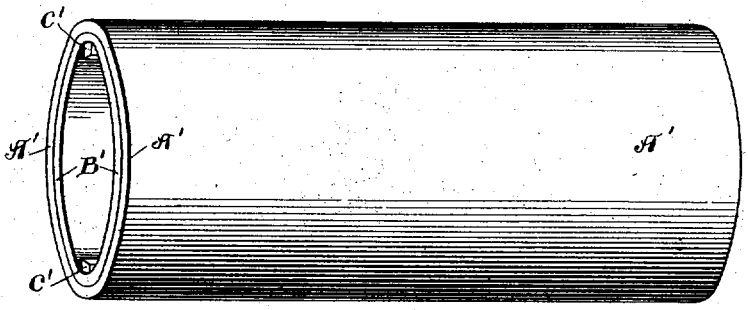

In the drawings, Figure 1 is a side elevation of a machine or apparatus in the best form known to me suitable for carrying into effect the several features of my invention. Fig. 2 is a top view of the same. Fig. 3 is a vertical section of the same, taken on a plane indicated by the broken line *x x* of Fig. 2. Fig. 4 is a cross-sectional view in a plane indicated by the line *y y* of Fig. 2 looking in the direction indicated by the half-arrow at said figure. Fig. 5 is a perspective view mainly of the molding-chamber, showing the same with its hinged parts opened out. Fig. 6 is a perspective view of one of the tubular printing devices in its preferred form made and employed in practicing my invention; and Fig. 7 is a cross-sectional view of the same on an enlarged scale, illustrating also the combination of the tubular printing device with the interior form-supports of the press.

Mounted upon a sufficiently strong rigid base-plate A, that is preferably supported by integrally-cast feet or footpieces *a*, is a melting-pot cylinder or chamber B, the annular foot-flange of which is securely bolted to the said base-plate A, and within the said cylindrical chamber is concentrically arranged the cylindrical melting-pot or metal-receptacle C, which is so arranged concentrically within the chamber B as to leave an annular space between its exterior and the interior of said chamber and also a space between the exterior of its bottom and the bottom of said chamber B, which space is filled in with some suitable refractory material, by preference fire-clay, as clearly shown in the drawings, (see particularly Fig. 3,) and the said melting pot or receptacle C is firmly supported or held in place concentrically within the fire-chamber B by means, as shown, of four (more or less) radially-projecting integral arms *d*, the outer ends of which rest upon and are securely bolted to the annular top flange *c* of the chamber B. The said melting-pot C is provided at one point with a radially-projecting tubular part *e*, which contacts at one point with the inner surface or wall of the chamber B, (see particularly Fig. 3,) which is perforated at this point for the accommodation of a tubular conduit *r*, which communicates with the part *e* of the melting-pot and serves to conduct the melted metal therefrom in a manner and for a purpose to be presently described.

Above the fire-chamber B, with its combined melting-pot C, is arranged a cylinder E, which is supported, as shown, upon a series of metallic stands D, the foot-flanges of which are securely bolted to the parts *d* of the metallic melting-pot, and the upper flanged ends of which are in like manner secured to the foot-flange of the said cylinder E. This cylinder is provided with a piston-rod *f*, at one end of which, working within the cylinder, is a piston $e^2$, while the opposite and lower end of said piston-rod *f* is provided with a piston or plunger F, which fits and works vertically within the cylindrical melting-pot C, all as clearly shown. The said cylinder is of course provided with the necessary and proper stuffing-box devices in its lower head, through which the said piston-rod works, and it is also provided with a gage $k$, suitably connected by a tube $j$ with the upper head of the cylinder for the purpose of indicating the degree of pressure exerted by any medium which may be used to drive the piston $e^2$ of said cylinder.

L is a supply-pipe communicating through the medium of a suitable valvular device N, provided with a handle O, with a vertical pipe M, the upper and lower branches of which communicate, respectively, at the upper and lower heads of the cylinder E with the interior of the latter, and through the medium of these last-named devices said cylinder may be supplied with a proper medium for driving its piston $e^2$ in either direction, as may be required, and for a purpose to be presently explained. In the case shown this cylinder E, with its connections and appliances, operates as a hydraulic engine to move upwardly and downwardly at the pleasure of the attendant of the machine and with any requisite power the plunger F of the melting-pot C; but in carrying into effect my invention some other medium than hydraulic pressure may of course be employed for the purpose of moving this plunger.

I have shown by broken lines the supply of molten zinc in the pot or chamber C, which supply, as illustrated, should not reach a higher level than the lower ends of the escape ports or passages $g$ (see Fig. 3) of said melting-pot, which ports communicate at their upper ends with the annular fire chamber or space between the melting-pot and the inclosing cylinder B, which annular space is more or less open at the upper end, as seen at $u$, Fig. 2, to permit the escape of the gaseous productions of combustion from the said annular fire-chamber. G is a pipe for the supply to the said annular fire-chamber of combined gas and atmospheric air, the supply being regulated by an ordinary valvular device or cock at $h$ and passing from the said supply-pipe to a network of vertically and horizontally arranged piping H, from which projects through the side walls and also through the bottom of the cylindrical chamber B a series of burners $i$, from which flames are injected into the mass of fire-clay which fills the space around and beneath the melting-pot C, as shown, and which is kept by the said burners $i$ in the properly-incandescent state to sufficiently heat the charge of zinc within the said melting-pot.

On the same metallic base-plate A, upon which is mounted, as above described, the chamber B, with its melting-pot and overhead compression-cylinder, is arranged a molding-chamber P, which is made in two parts hinged together at the point nearest to the said chamber B by means of female articulate members $n$ and $n'$, projecting from the respective portions of said two-part molding-chamber and properly combined, as shown, with the vertical male members or pintle-like devices $m$, the lower one of which is securely fastened to the base-plate A, from the top surface of which it projects upwardly, as shown, and the two portions of this molding-chamber P are provided at points diametrically opposite the hinges thereof with a set of radially-projecting lugs $o$, with one set of which are pivotally connected, as shown, locking or clamping bolts $p$, by means of which the hinged parts of said molding-chamber are securely fastened together, as seen at Figs. 1, 2, 3, and 6, and by the loosening and swinging out of which clamping-bolts, as shown at Fig. 5, the hinged parts of said molding-chamber may be swung apart, as illustrated at the last-mentioned figure, for the purpose of extricating from the chamber the casting which may have been made therein. Each of the parts of this molding-chamber is made, as shown, with hollow vertical walls and a cellular bottom portion, the said hollow spaces being filled in with fire-clay, as illustrated in the drawings, for a purpose to be presently described, and the interior of said molding-chamber P is connected at its lowermost portion, through the medium of the conduit $r$, hereinbefore referred to, with the interior of the melting-pot C, as plainly shown, (see Fig. 3,) and the said connection or communicating tube $r$ is provided near its middle with a cut-off or valvular device U (operated, preferably, by a screw-stem and hand-wheel, as seen at Figs. 3 and 6) for the purpose of permitting or preventing the flow of molten metal from the melting-pot to the interior of said molding-chamber, as occasion may require. Around the said molding-chamber P is arranged a network of piping $H^2$, very similar to that used in connection with the fire-chamber B, but connected only with the movable parts of said molding-chamber and flexibly connected, as seen at K, with the said system of piping H through a branch pipe J, a short distance below which branch pipe is located a suitable valvular device or cock I, by means of which the supply of combined air and gas afforded from the piping H may be at pleasure turned onto or off from the piping $H^2$ of the molding-chamber, and from the said piping $H^2$ projects radially only into said molding-chamber a series of burners $i^2$, which discharge their flame-jets into the annular spaces or cellular portions of the molding-chamber, which, as clearly illustrated in the drawings, are filled with fire-clay to be heated up by the flame-jets to any desired degree for the purpose of keeping the interior of the mold hot, for a purpose to be presently explained.

S is a cast-iron core which is mounted centrally in the mold. It is accurately shaped exteriorly to exactly reproduce in the mold the exterior shape and size and dimensions of the interior supporting parts of the press designed later to support the tubular printing devices in the press. As shown in the drawings, the core S is tapered from end to end as the form-supports of the press are tapered, the upper end of the core being the smaller in diameter.

Q is a cold-water-supply pipe which is permanently arranged in the base-plate A of the machine, with its upper end projecting slightly up within and tapped into the cast-iron core S of the mold, (see specially Figs. 3 and 4,) which core S has an axial bore or passage-way R running through it, the upper portion of which bore is provided with a bushing *s*, screwed into the core and formed with tapering upper orifice, within which fits the corresponding tapered lower end of an exit-pipe T, which, as shown, is preferably formed with an elbow, the outer arm of which is pivotally connected with a waste-pipe, so that the said bent exit-pipe T may be either set in communication with the bushing *s*, as shown in full lines, or may be swung up out of connection with said bushing, as illustrated by the dotted lines at Figs. 3 and 6. By means of this arrangement of devices a supply of cold water may at pleasure be afforded to the cast-iron core S of the molding-chamber, the said supply of water being let on preferably at the lower end of the supply-pipe Q, as indicated by the half-arrow at Fig. 1, under sufficient pressure to keep up a circulating supply, thence through the bore R of the core S, and thence upwardly and away from the machine through the connected exit-pipe T and a suitable waste or discharge pipe.

In the molding-chamber, (illustrated in Figs. 1 to 5 of the drawings,) *t* is a copper tube which is to constitute the inner strengthening-shell of the composite tubular printing device involved in my invention. It is accurately prepared internally to fit the interior supporting parts or form-supports of the press. Consequently it fits accurately and snugly onto the core S of the molding apparatus and is supported internally by said core and from end to end and at all points. The exterior of the copper tube is preferably made perfectly cylindrical and circumferentially continuous, so that said copper tube is of slightly-greater thickness at its upper end or mouth than at the lower end, and the arrangement and proportions of the parts are such, as shown, that between the exterior of said copper tube, thus fitting exactly onto the tapering core S and the inner cylindrical and continuous wall of the two-part molding-chamber P, there occurs an annular space equal in thickness to the designed or proposed thickness of the zinc tube to be cast in said molding-chamber, into which tubular space the molten metal is forced, as will be presently explained. At Figs. 3 and 4 this annular space is represented by the broken lines as being occupied by the molten zinc up to the same level as the molten mass in the pot C. The inner walls of the molding-chamber P are carefully and uniformly finished to a uniform surface of such a nature as to produce the exact character and textures of surface desired on the outer or printing surface of the casting, adapting that surface to have a design transferred to it after the lithographic manner.

In the general operation of the apparatus illustrated in the drawings thus far herein described with reference to its construction and the arrangement of its several parts the melting-chamber C having been supplied with the proper charge of metallographic metal, such as zinc or zinc alloy or other material having the properties which adapt it for use in the same manner as lithographic stone, and said charge heated up to the proper degree by the appliances already explained, the gaseous and other products of combustion of the fire-chamber escaping from the open portions of the annular space containing the fire-clay, and the molding-chamber having had its parts securely fastened together after the proper application to the cast-iron of the copper tube or cylinder before mentioned, and the supply of cold water having been put in circulation through the core of the molding-chamber when the molten mass in the melting-pot shall have reached the proper liquid state for the casting operation and the molding-chamber been properly heated by the appliances hereinbefore mentioned, the valvular device or gate at U in the connecting-pipe *r* having been opened, the molten metal flows or is forced from the melting-pot through said conduit *r* into the annular space between the inner uniformly and carefully finished wall of the molding-chamber P and the external surface of the copper in the mold and is forced to ascend through said annular space and fill the same by reason of the plunger F of the hydraulic or other cylinder being forced down within the melting-pot to a sufficient extent not only to force the molten metal upwardly within the molding-space of the chamber P, but to also force and hold the molten metal within said chamber under a sufficiently high degree of pressure to insure the casting of a perfect zinc tubular device of even density throughout the cast mass without any irregular, superficial, or other porosity and of such surface texture as is desirable and necessary for the purpose for which I make these hollow tubes. As will be seen by references to Fig. 3, any air or combined air and gases which may be contained in the small cylindrical space between the top of the molten metal in the melting-pot and the base of the plunger F will be caused by the initial descent of said plunger to pass upwardly and out of the melting-pot through the escape ports or passages *g*, and after the periphery of the plunger shall have passed the lower ends of said ports and come into contact with the top surface of the mass of molten metal further communication between said ports and that part of the melting-chamber which contains the molten material will be cut off and the mass of metal forced downwardly within the chamber C and upwardly within the molding-chamber P under any desired degree of pressure. In practice I hold the metal in the molding-chamber thus under hydraulic or other considerable pressure (by means of the plunger F) until the metal within the mold shall have partially or completely solidified, whereupon by manipulating the cut-off gate U, thus closing communication between the mold and the melting-pot, the pressure on the metal in the latter may be removed. At the same time by keeping the molding-chamber hot by the appliances hereinbefore described the cast-zinc tube is not permitted to solidify or cool too rapidly, especially at the vicinities of its exterior or peripheral surface. Inasmuch as the core S is kept comparatively cool by the cold-water-circulating device, the copper cylinder, which is to ultimately constitute the lining of the composite printing-tube, is not so much heated as the mass of molten metal and is sooner cooled, and therefore in the final cooling and necessary contraction of the molten metal into a zinc tube the latter will practically be shrunk onto the copper tubular lining, at which time the copper tube is firmly supported at every point against collapse or distortion. Thus is effectuated a strong and perfect union and integration between these two separate tubular devices, which is of course of great advantage. It will be understood, of course, that in the manipulation of the different devices of the machine shown and described the supply of heat both to the fire-chamber for melting the zinc and to the molding-chamber in the process of casting the zinc cylinder is to be controlled and regulated according to the judgment and experience of the operator of the machine or contrivance. During the casting process or operation to permit the escape from the interior of the mold of air or gas or impurities that may be forced out by the rising metal I have provided at *v* a valvular vent, which may be opened and closed, as occasion may require, and it will be seen that in the use of a machine such as I have shown and described in the manner set forth the result is the production of a zinc tube or hollow cylinder which though of comparatively slight thickness (usually a little more than an eighth of an inch) will be perfect in form or outline and with a surface of a uniform degree of density, so that it has to be neither turned, bored out, nor exteriorly prepared to possess a fit condition for use for the purpose for which I design such zinc tubes—namely, to constitute the cylindrical printing-surface for relief or planographic or intaglio printing—for which purpose the uniform surface of the cast tube has only to receive the impression or design and then to be properly etched, according to the usual method or process of etching, or routed out or properly developed otherwise into the character of printing-surface desired. After the casting shall have sufficiently cooled or solidified within the molding-chamber the latter has its hinged parts swung open (after having released the clamping bolts or devices) into the condition illustrated at Fig. 5, whereupon after cutting off the supply of cold-water circulation and swinging up and out of the way the exit-pipe T the sprue or connection between the lower end of the finished casting and the stock of zinc in the contiguous end of the supply-tube *r* may be sawed or cut off, and thereafter the finished casting, with its firmly-attached copper lining, may be readily removed, with the slightly-tapering core S of the molding apparatus, and the latter then slipped out from the composite tube.

According to my invention I produce numerous tubes with continuous cylindrical printing-surfaces which will all perfectly fit on the form-supports of the press, and since the casting-machine is comparatively simple in construction and can be easily operated as a part of the plant of a printing establishment, so that the printing tubes or cylinders do not have to be cast at a separate place, economic results are accomplished and the casting of the zinc tubes can be done at comparatively little cost, and after having been used the tubes, if wholly of zinc, can be melted up and cast again without loss of stock or material or, if partly of zinc, the zinc or a sufficient part of it can be turned off in a lathe and the tube that is left slipped over the core S, as described. The copper part of the composite tube can thus be used and reused an indefinite number of times, and thus becomes a permanent part of a series of successive printing-tubes, and the outer zinc portion or printing-surface becomes in contrast a removable and renewable envelop integral with the inner strengthening-shell throughout the printing and presenting a new and fresh and unused printing-surface for each new design to be printed.

The copper-tube lining is carefully made internally to begin with and at great expense, so as absolutely to fit on the form-supports of the press, and so on the core S of the casting apparatus, and preferably it tapers evenly from end to end to fit a correspondingly-tapered form-support, and it may be used and reused an indefinite number of times without losing its shape or size, and thus the composite tube has a permanent shape internally, the cast zinc or substantially all of it (it is immaterial whether a small part be left on the exterior of the copper tube or not) being removable, as by being turned off in a lathe after the use of the tube as a printing-surface for a given design is completed. Where the tube is wholly of zinc, it is wholly melted up after each printing job is completed, and reliance is placed for the accurate internal as well as external shaping of the tube upon the method of and apparatus for casting herein shown, the core S shaping the tube internally and the inner walls of the mold P shaping the tube externally and determining its surface character and texture.

Figs. 6 and 7 show the improved tubular printing device in its preferred form. Referring to those figures, A′ is the removable and renewable outer cast part of the composite tube and constitutes the printing-surface, and B′ is the permanent inner strengthening-shell, which accurately fits the interior form-supports of the press and on which the outer shell A′ is cast and shrunk, the two being integrally united. *c′ c′* are inwardly-projecting lugs adapted and fitted to take into grooves in the outer surface of the form-supports of the press. These lugs *c′ c′* may be made integral with or in any desired way securely fastened to the inner shell B′. The shell B′ is internally tapered from end to end to correspond to the external taper on the form-supports of the press and on the core S and so as to be at all times and at every point suitably supported internally not only during the casting operation, but also during the developing and printing operations. The form-support of the press is shown in section in Fig. 7 at D′. In practice the composite tubular device is removable from and replaceable on the form-supports of the press and is adjustable in both directions on such form-supports or with such supports in the press, as set out fully in applications heretofore filed by me. Fig. 7 illustrates the mounting of my tubular printing device upon a form-support of the press.

In carrying out my invention as a whole I first permanently and with painstaking care draw and turn and bore and shape internally with an internal taper running from end to end the copper tube that is to constitute the hollow inner strengthening-shell of the composite tubular printing-form, so as to permanently adapt the form to the interior form-supporting devices of the press, preferably making the copper tube cylindrical exteriorly. I then integrally apply to the outer surface of the copper tube a separate printing-surface by casting, as heretofore set out, the mold having internally a peripheral uniformly and carefully finished planographic surface adapted to come into contact with and give shape and texture to the outer surface of the cast metal and so as to shape the composite printing-form exteriorly, the mold being accurately shaped and finished to that end, so as to adapt this outer or printing surface of the printing-form to the coöperating printing parts of the press. I then suitably transfer the design or picture to be printed to this external planographic surface of the printing-tube and by suitable etching or etching and routing or by other suitable steps. I then develop that surface into a relief printing-surface or into a planographic printing-surface or into an intaglio printing-surface, according to the character of printing desired, or sometimes into one and sometimes into another character of printing-surface. I then print the desired edition from the tubular printing-surface as developed. I then turn off on a lathe or eat off with acids or otherwise remove the outer or printing surface of the composite tube, either down to the copper or not, as desired, care being taken not to affect or modify the interior shape or dimensions of the inner copper shell. I then integrally apply a second printing-surface by casting, as before, the mold determining, as before, the exterior shape and dimensions and surface character of the printing-surface and in such way as to again constitute the surface a uniform planographic surface and to adapt it to the coöperating printing parts of the press. I then apply the new design or picture that is to be printed to the tubular surface, develop it into the character of printing-surface desired, and print therefrom, and so on. In this way the exact shape and size of printing-form for proper handling and support and exact register and proper printing in the press are attained and reliably and cheaply maintained throughout a series of successive printing operations, and a fresh and unused printing-surface is presented by the printing-form for each new picture or design to be printed.

My invention is of peculiar value and importance in relief-printing and particularly in multicolor relief-printing.

What I claim as new, and desire to secure by Letters Patent, is—

1. The improvement in the art of printing which consists in casting a printing-form of suitable material in a mold having a molding-face of such a nature that it will produce a uniform surface accurately formed exteriorly both as to shape and as to surface character so as to adapt the printing-form without further preparation to receive a design after the lithographic manner of transferring, applying a design to the surface thus produced as by transferring, developing said surface into a printing-surface for that design of the character desired, printing the desired edition therefrom in a suitable press, casting a second printing-form of the same size as before, applying a design to the surface of the second printing-form, developing said surface into a second printing-surface and printing therefrom as before, and so on, whereby the exact shape and size of the printing-form and of the designs thereon for proper printing and exact register in the press are attained and reliably and cheaply maintained throughout a series of successive printing operations, and a fresh and unused printing-surface of the same predetermined size is presented for each new picture or design.

2. The improvement in the art of printing which consists in casting a printing-form of metallographic metal in a mold having a molding-face of such a nature that it will produce a uniform surface accurately formed exteriorly both as to shape and as to surface character so as to adapt the printing-form without further preparation to receive a design after the lithographic manner of transferring, applying a design to the surface thus produced as by transferring, developing said surface into a planographic printing-surface for that design, printing the desired edition therefrom in a suitable press, casting a second printing-form of metallographic metal of the same size as before, applying a design to the surface of the second printing-form, developing said surface into a second planographic printing-surface and printing therefrom as before, and so on, whereby the shape and size of the printing-form and of the designs thereon for proper printing and exact register in the press are attained and reliably and cheaply maintained throughout a series of successive printing operations, and a fresh and unused printing-surface of the same predetermined size is presented for each new picture or design.

3. The improvement in the art of printing which consists in casting a plurality of printing-forms of suitable material in a mold having a molding-face of such a nature that it will produce uniform surfaces accurately formed exteriorly both as to shape and as to surface character so as to adapt the printing-forms without further preparation to receive a design after the lithographic manner of transferring, applying a design to each of the surfaces thus produced as by transferring, developing said surfaces into printing-surfaces for those designs of the character desired, mounting the said printing-forms in a suitable printing-press in predetermined relation to each other and to the coöperating parts of the press and printing therefrom, whereby the exact shape and size of the printing-forms and of the designs thereon for proper printing and exact register in the press are reliably and cheaply attained.

4. The improvement in the art of printing which consists in casting a plurality of printing-forms of metallographic metal in a mold having a molding-face of such a nature that it will produce uniform surfaces accurately formed exteriorly both as to shape and as to surface character so as to adapt the printing-forms without further preparation to receive a design after the lithographic manner of transferring, applying a design to each of the surfaces thus produced as by transferring, developing said surfaces into planographic printing-surfaces for those designs, mounting said printing-forms in a suitable press in predetermined relation to each other and to the coöperating parts of the press, and printing therefrom, whereby the exact shape and size of the printing-forms and of the designs thereon for proper printing and exact register in the press are reliably and cheaply attained.

5. The improvement in the art of printing which consists in casting a set of printing-forms of suitable material in a mold having a molding-face of such a nature that it will produce uniform surfaces accurately formed exteriorly both as to shape and as to surface character so as to adapt the printing-forms without further preparation to receive a design after the lithographic manner of transferring, applying a design to each of the surfaces thus produced as by transferring, developing said surfaces into printing-surfaces for those designs of the character desired, mounting said printing-forms in a suitable press in predetermined relation to each other and to the coöperating parts of the press, printing therefrom, casting a second set of printing-forms in the same mold as before, applying a design to each of the surfaces of the second set of printing-forms, developing said surfaces into a second set of printing-surfaces, and printing therefrom as before, and so on, whereby the exact shape and size of the printing-forms of and the successive sets of printing-forms and of the designs thereon for proper printing and exact register in the press are attained and reliably and cheaply maintained throughout a series of successive multicolor-printing operations, and fresh and unused surfaces of the same predetermined size are presented for each new picture or design.

6. The improvement in the art of printing which consists in casting a set of printing-forms of metallographic metal in a mold having a molding-face of such a nature that it will produce uniform surfaces accurately formed exteriorly both as to shape and as to surface character so as to adapt the printing-forms without further preparation to receive a design after the lithographic manner of transferring, applying a design to each of the surfaces thus produced as by transferring, developing said surfaces into planographic printing-surfaces for those designs, mounting said printing-forms in a suitable press in predetermined relation to each other and to the coöperating parts of the press, printing the desired edition therefrom, casting a second set of printing-forms in the same mold as before, applying a design to each of the second set of surfaces thus produced, developing said surfaces into planographic surfaces for those designs, and printing therefrom as before, and so on, whereby the exact shape and size of the printing-forms and of the successive sets of printing-forms and of the designs thereon for proper printing and exact register in the press are attained and reliably and cheaply maintained throughout a series of successive multicolor-printing operations, and a fresh and unused printing-surface of the same predetermined size is presented for each new picture or design.

7. The improvement in the art of printing which consists in permanently shaping interiorly a hollow inner strengthening-shell for a printing-form so as to permanently adapt the form to the interior form-supporting device of the press, forming a molding-surface of such a nature that it will produce in a casting made therefrom a uniformly-finished surface adapted to have a design transferred thereto after the lithographic manner of transferring, integrally applying a separate coating to the outer surface of said inner shell by making a casting of suitable material thereon from said molding-surface, transferring a design to the surface of the printing-form thus produced, developing said surface into a printing-surface of the character desired, printing the desired edition therefrom in the press, removing the outer surface of the printing-form without affecting the interior shape or dimensions of the inner strengthening-shell, integrally applying a second coating to said inner strengthening-shell by casting as before, transferring a design to the surface of the second printing-form thus produced, developing said surface into a second printing-surface and printing therefrom as before, and so on, whereby the exact shape and size of the printing-form for proper handling and support and exact register and proper printing in the press are attained and reliably and cheaply maintained throughout a series of successive printing operations and a fresh and unused printing-surface is presented by the printing-form for each new picture or design to be printed.

8. The improvement in the art of planographic printing which consists in permanently shaping interiorly a hollow inner strengthening-shell for a printing-form so as to permanently adapt the form to the interior form-supporting devices of the press, forming a molding-surface of such a nature that it will produce in a casting made therefrom a uniformly-finished surface adapted to have a design transferred thereto after the lithographic manner of transferring, integrally applying a separate coating to the outer surface of said inner shell by making a casting of suitable material thereon from said molding-surface, transferring a design to the surface of the printing-form thus produced, developing said surface into a planographic printing-surface, printing the desired edition therefrom in the press, removing the outer surface of the printing-form without affecting the interior shape or dimensions of the inner strengthening-shell, integrally applying a second coating to said inner strengthening-shell by casting as before, transferring a design to the surface of the second printing-form thus produced, developing said surface into a second planographic printing-surface and printing therefrom as before, and so on, whereby the exact shape and size of the printing-form for proper handling and support and exact register and proper printing in the press are attained and reliably and cheaply maintained throughout a series of successive printing operations and a fresh and unused planographic surface is presented by the printing-form for each new picture or design to be printed.

9. The improvement in the art of printing which consists in permanently shaping interiorly a plurality of hollow inner strengthening-shells for a plurality of printing-forms so as to permanently adapt the forms to the interior form-supporting devices of the press, forming a molding-surface of such a nature that it will produce in the castings made therefrom a uniformly-finished surface adapted to have a design transferred thereto after the lithographic manner of transferring, integrally applying a separate coating to the outer surface of each of said inner shells by making a casting of suitable material thereon from said molding-surface, transferring the design to the surface of the printing-forms thus produced, developing said surfaces into printing-surfaces of the character desired, mounting said printing-surfaces in a suitable press in predetermined relation to each other and to the coöperating parts of the press and printing the desired edition therefrom, whereby the exact shape and size of the printing-forms for proper handling and support and exact register and proper printing in the press are reliably attained for the operation of printing a multicolor design.

10. The improvement in the art of planographic printing which consists in permanently shaping interiorly a plurality of hollow strengthening-shells for a plurality of printing-forms so as to permanently adapt the forms to the interior form-supporting devices of the press, forming a molding-surface of such a nature that it will produce in the castings made therefrom a uniformly-finished surface adapted to have a design transferred thereto after the lithographic manner of transferring, integrally applying a separate coating to the outer surface of each of said inner shells by making a casting of suitable material thereon from said molding-surface, transferring the design to the surface of the printing-forms thus produced, developing said surfaces into planographic printing-surfaces, mounting said printing-surfaces in a suitable press in predetermined relation to each other and to the coöperating parts of the press and printing the desired edition therefrom, whereby the exact shape and size of the printing-forms for proper handling and support and exact register and proper printing in the press are reliably attained for the operation of printing a multi-color design.

11. The improvement in the art of printing which consists in permanently shaping interiorly a plurality of hollow inner strengthening-shells for a plurality of printing-forms so as to permanently adapt the forms to the interior form-supporting devices of the press, forming a molding-surface of such a nature that it will produce in the castings made therefrom a uniformly-finished surface adapted to have a design transferred thereto after the lithographic manner of transferring, integrally applying a separate coating to the outer surface of each of said inner shells by making a casting of suitable material thereon from said molding-surface, transferring the design to the surface of the printing-forms thus produced, developing said surfaces into printing-surfaces of the character desired, mounting said printing-surfaces in a suitable press in predetermined relation to each other and to the coöperating parts of the press, printing the desired edition therefrom, removing the outer surface of the printing-forms without affecting the interior shape or dimensions of the inner strengthening-shells, integrally applying a second coating to each of said inner strengthening-shells by casting as before, transferring the design to the surface of each of the second printing-forms thus produced, developing said surfaces into a second set of printing-surfaces and printing therefrom as before, and so on, whereby the exact shape and size of the printing-forms for proper handling and support and exact register and proper printing in the press are attained and reliably and cheaply maintained throughout the operation of printing a multicolor design and throughout a series of successive printing operations and a fresh and unused printing-surface is presented by the printing-forms for each new picture or design to be printed.

12. The improvement in the art of planographic printing which consists in permanently shaping interiorly a plurality of hollow inner strengthening-shells for a plurality of printing-forms so as to permanently adapt the forms to the interior form-supporting devices of the press, forming a molding-surface of such a nature that it will produce in the castings made therefrom a uniformly-finished surface adapted to have a design transferred thereto after the lithographic manner of transferring, integrally applying a separate coating to the outer surface of each of said inner shells by making a casting of suitable material thereon from said molding-surface, transferring the design to the surface of the printing-forms thus produced, developing said surfaces into planographic printing-surfaces, mounting said printing-surfaces in a suitable press in predetermined relation to each other and to the coöperating parts of the press, printing the desired edition therefrom, removing the outer surface of the printing-forms without affecting the interior shape or dimensions of the inner strengthening-shells, integrally applying a second coating to each of said inner strengthening-shells by casting as before, transferring the design to the surface of each of the second printing-forms thus produced, developing said surfaces into a second set of planographic printing-surfaces and printing therefrom as before, and so on, whereby the exact shape and size of the printing-forms for proper handling and support and exact register and proper printing in the press are attained and reliably and cheaply maintained throughout the operation of printing a multicolor design and throughout a series of successive printing operations and a fresh and unused planographic printing-surface is presented by the printing-forms for each new picture or design to be printed.

In testimony whereof I have signed my name to this specification in the presence of two subscribing witnesses.

EDWARD HETT.

Witnesses:
EDWIN SEGER,
J. H. FREEMAN.